Dec. 26, 1944.　　　L. W. SIMONS　　　2,365,731
CAMBER AND CASTER CORRECTION TOOL
Filed June 18, 1942

INVENTOR
L. W. Simons.
BY E. M. McKnight
ATTORNEY

Patented Dec. 26, 1944

2,365,731

UNITED STATES PATENT OFFICE 2,365,731

CAMBER AND CASTER CORRECTION TOOL

Lowell W. Simons, Tulsa, Okla.

Application June 18, 1942, Serial No. 447,597

1 Claim. (Cl. 153—32)

This invention relates generally to a means for bending bars and more particularly but not by way of limitation to a bending tool for correcting both camber and caster of the steering knuckle support arm of an automobile.

In present day automobiles utilizing knee-action, or individual wheel control, the steering support arm or "king pin support arm" upon becoming knocked out of line loses both camber and caster to cause a distorted alignment of the wheels of the automobile, which in turn creates undue wear and tear on the rubber tires provided thereon. This invention contemplates a correction tool for adjusting both the proper camber and caster for the steering knuckle in one operation.

It is an important object of this invention to provide a bending tool that will simultaneously adjust both camber and caster for the steering support arm of an automobile without removing any of the necessary parts of the steering arm.

And still another object of this invention is to provide a bending tool for correcting camber and caster of a steering knuckle simultaneously in a simple, accurate and expeditious manner, wherein the correction is made on the wheels of the automobile in the same position of road level.

And still another object of this invention is to provide a bending tool for simultaneously adjusting the camber and caster of an automobile steering arm, which is constructed in such a manner to provide a direct thrust for camber while simultaneously allowing rotation to adjust caster.

And an additional object of this invention is to provide a bending tool of such construction so as to be actuated by hydraulic pressure supported below the A-frame of an automobile whereby a safer and more effective force is provided.

Other objects and advantages of the invention will be evident from the following detailed description read in conjunction with the accompanying drawing which illustrates one form of my invention.

In the drawing:

Figure 5 is a detailed view of the hook members of the pressure bar.

Figure 1:
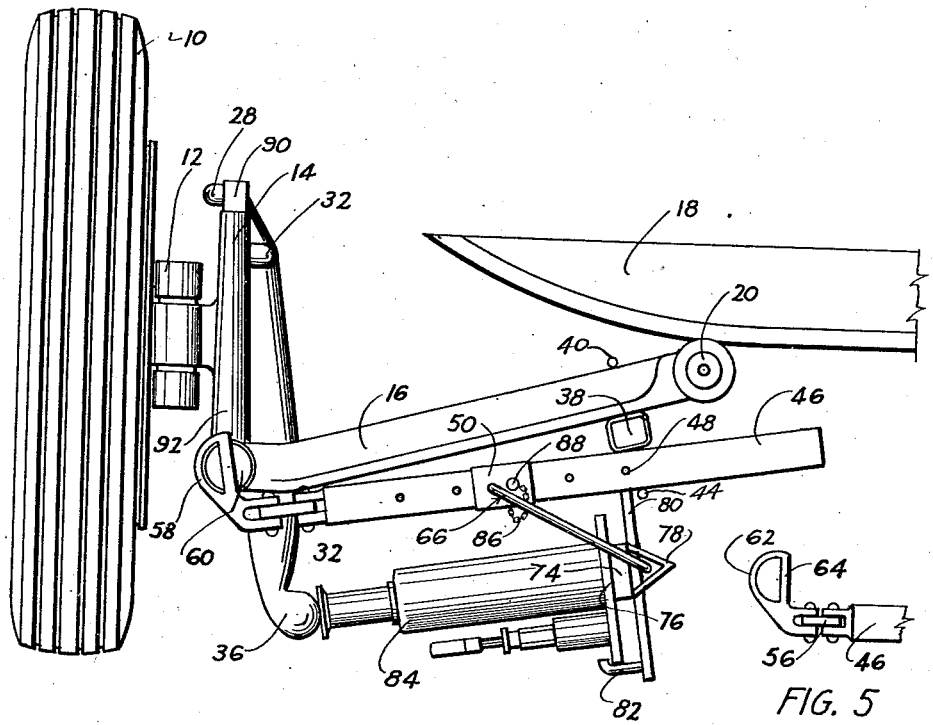
Figure 1 is a view of front elevation showing the invention adapted for use on one wheel of an automobile having certain parts broken away for better illustration.

Referring to the drawing in detail, reference character 10 designates the wheel and tire of an automobile having the usual king pin 12 and king pin support arm or steering knuckle support arm 14 cooperating with the A-frame 16 of the automobile. The A-frame 16 is attached to the main frame 18 as shown at 20 in any conventional manner. It will be apparent that the automobile structure forms no part of this invention but that the bending tool can be applied to any type or make of automobile utilizing individual wheel control.

The correction tool 22 is formed with a body portion 24 having its upper end provided with an outwardly extending projection or finger 26. The outer end portion of the finger 26 is rounded or curved at 28 to form a slight hook. At a point below the finger 26 the body is provided with a second outwardly projecting member or thumb 30 having a hook portion 32 for a purpose as will be hereinafter described. The lower portion of the body 24 is provided with an angularly disposed leg member 34 having an outwardly projecting foot member 36.

Figure 3:
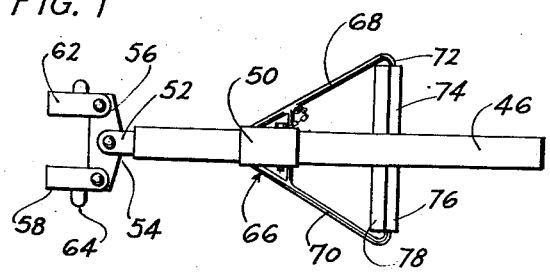
Figure 3 is a plan view of the pressure bar and cooperating hook.
Figure 2:
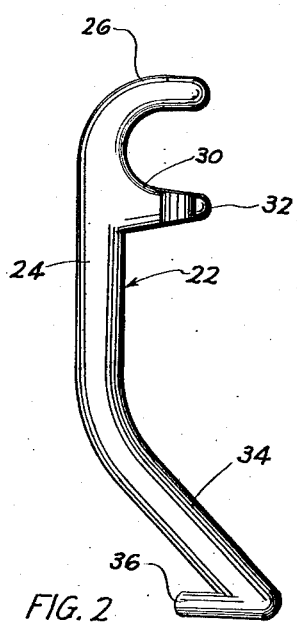
Figure 2 is a detail view of the bending tool.
Figure 4:
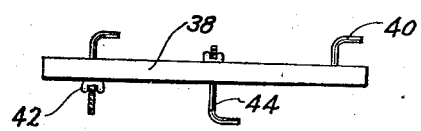
Figure 4 is a side elevational view of the hold bar of the invention.

Referring to Figures 1, 3 and 4 in order for the bending tool 22 to apply pressure when disposed around the steering arm support in a manner to be hereinafter described, a hold bar 38 is disposed below the A-frame and connected thereto by threaded hooks 40 cooperating with adjustable wing nuts 42. As shown in Figure 4 two hooks 40 are sufficient to support the hold bar 38, but it will be understood that any number may be utilized as desired. A similar threaded hook 44 is provided with the bar 38, but has its hook portion extending in a direction opposite to that of hooks 40 in order to assist in the support of the pressure bar 46. The pressure bar 46 comprises a hollow rectangular member having a plurality of aligned apertures 48. A substantially rectangular slidable member 50 is carried by the bar 46 for a purpose as will be hereinafter set forth. One end of the pressure bar 46 is provided with a bifurcated or yoke connection 52 having aligned apertures 54. A body portion 56 of a hook member is secured in the yoke in a freely rotatable manner by means of a bolt disposed in the apertures 54 and an aperture (not shown) in the body portion. A pair of freely movable hook members 58 are secured at opposite sides of the body 56 and are adapted to circumvent the pivot bushing 60 disposed on the outer end portion of the A-frame 16. The hook members assist the hold bar 38 in supporting the pressure bar 46 immediately under the A-frame 16.

The hook members 58 are formed with semicircular loop portions 62 each of which are connected by a bar or bracket 64. For application of the hook to the pivot bushing 60, the hook members are swung outwardly in order to facilitate the operation. Upon swinging back into line the pivot bushing rests within the loop portions 62 so that the king pin supporting arm 14 is disposed directly between the hook members 58. In this manner regardless of any angular movement of the body 56 the arm 14 is always on center with respect to the hook members.

A bracket member 66 of substantially A-shape is welded to opposite sides of the slidable member 50. The bracket comprises outwardly projecting legs 68 and 70 interconnected by a cross bar 72. A freely rotatable plate 74 having a flat portion 76 on one surface thereof for a purpose as will be hereinafter described, is secured to the bar 72 by an angle bar 78 welded thereto and having the bar 72 disposed therethrough. A perpendicularly disposed bar 80 is welded to the opposite face of the plate 74, for a purpose as will be hereinafter set forth. The lower portion of the bar is provided with a plurality of apertures to which is secured through means of a bolt a bracket member 82 for supporting a pressure jack 84 as will be hereinafter described.

It will be apparent that the aligned apertures 48 provide adjustment for the member 50 on the pressure bar 46. A bolt chain 86 is welded to the bracket 66 and carries a bolt 88 adapted to be inserted through the apertures 48 for holding the member 50 and its complementary bracket 66 in whatever adjusted position desired. From Figure 1 it will be apparent a conventional jack 84 is adapted to be disposed between the pressure foot 36 and the flat portion 76 of the plate 74. It will be apparent the adjustment of the slidable member 50 can allow for various sized jacks for utilization with the pressure bar. In practice jacks from 6 to 26 inches long have been utilized.

The base of the jack 84 is adapted to rest in the bracket 82 while the jack piston contacts the foot member 36. The plate 74 is rotatable so that the flat portion 76 contacts the jack base to provide proper alignment of the jack in directing a positive force against the foot member 36. With the jack in position the bar 80 contacts the under face of the pressure bar 46 to assist in maintaining the jack and plate 74 in proper position.

*Operation*

In operation the correction tool 22 is disposed adjacent the king pin support arm 14 so that the finger 26 bears against one portion of the periphery of the arm 14 in proximity of the top 90 thereof, while the thumb 30 bears against the periphery and at a point substantially opposite finger 26 and below the top portion 90. It will be apparent that the hook members 28 and 32 of the finger and thumb, respectively, have a tendency to circumvent the arm 14. The body 24 extends below the arm 14 and pivot bushing 60 so that the angular leg 34 and its foot member 36 extend into a position to be contacted by the jack 84. In practice it has been found that a retaining block (not shown) may be placed between the top of the king pin arm 14 and a portion of the frame of the car (not shown) in order to hold the car at road level. The disposition of the tool 24 as shown in Figure 1 is such to put in camber or adjust the wheel for more camber. Upon application of pressure by the jack 84 against the foot 36 there is a reacting force in an opposite direction by the finger 28. As a consequence force and pressure is applied by the thumb 30 against the upper arm portion of the arm 14, causing the upper half of the arm 14 to be bent in a direction away from the wheel 10, thereby changing the angle of the king pin 12 to whatever degree desired, and thus decrease the camber of the wheel.

It will be apparent that the correct camber can be determined by any conventional camber gauge. In the event there is a distortion of the caster as well as the camber the tool 22 can be rotated as desired to change the circumferential position of the finger 26 and thumb 28 with a complementary movement of the foot 36. In this manner upon the application of force by the jack 84 in addition to adjusting camber as above described, the thumb and finger simultaneously adjusts the caster in accordance with any degree as determined by the adjusted circumferential position of the tool 22. In order to assure a direct and effective force by the jack 84 against the foot member 36 in adjusting caster, any rotation of the tool on the arm 14 is compensated for by the hook body 56.

With the pressure bar 46 and jack moved relative to the adjusted angular position of the tool, the body 56 is rotatable with respect to the bar 46 and assures positive support therefor, as well as a direct force by the jack against the foot 36. The plate 74 assists in maintaining the jack in proper alignment.

In order to take out or decrease the camber of the wheel, the tool 22 is arranged on the arm 14 (not shown) so that the thumb 30 is disposed below the center and adjacent the lower half 92 of the arm 14, whereby upon application of pressure against the foot 36 by the jack 84, the thumb 30 directs a force against the lower half of the arm 14 to bend the arm toward the wheel by changing the angle of the king pin 12 so that the camber is decreased or taken out of the wheel. It will be apparent that any angular adjustment of the tool 22 in this position can simultaneously adjust the caster as above described.

In the present disclosure (Fig. 1) the tool has been shown arranged on the arm 14 at a point in the rear of the frame 16 and arm 14 of the right front wheel of the automobile. The tool 22 in this application is termed a right handed tool. However, it will be apparent that camber and caster can be corrected on the king pin arm for the right wheel (as shown) with a tool arranged in the front or an opposite position on the arm from that shown in Figure 1. While this disclosure is not shown the utilization of a bending tool in front is termed a left hand tool and differs from the right hand tool in the arrangement of the finger 28, thumb 30 and foot 36. In utilizing a left hand tool in front of the arm 14, the tool is constructed so that the direction of the hooked portions of the finger and thumb respectively are in an opposite direction from those in the right hand tool (as shown). Similarly the foot member 36 projects from the opposite side of the angular leg 34 than that of a right hand tool. The simultaneous adjustment of camber and caster can be adjusted from the front of the arm 14 with a left hand tool in the same manner as above described. In practice the tool disclosed in Figure 1 is classified as a right hand tool for the right front wheel of an automobile, but as a left hand tool for the left front wheel of an automobile by merely changing the position with which the tool engages the arm 14 of a respective wheel of an automobile.

From the foregoing it will be apparent that the invention contemplates a simple, accurate and expeditious tool for simultaneously correcting the camber and caster of a steering knuckle of an automobile utilizing individual wheel control. Furthermore, the camber and caster correction can be made without necessarily removing any parts of the steering arm.

Changes may be made in the combination and arrangement of parts as heretofore set forth in the specification and shown in the drawing, it being understood that any modification in the precise embodiment of the invention may be made within the scope of the following claim without departing from the spirit of the invention.

I claim:

A bending tool for correcting camber and caster of the steering knuckle of an automobile, comprising a rigid body member which when in an upright position is provided at its top with an integral forwardly projecting finger adapted to engage one side of the top portion of a steering knuckle support arm, a forwardly projecting thumb integral with said body, arranged below the finger and displaced laterally relatively thereto and adapted to engage the opposite side of said support arm, the body extending downwardly below said thumb for a distance approximately equal to the distance between the top of the finger and the bottom of the thumb and a leg of approximately the same length as the body, rigidly united therewith and inclined gradually forwardly and downwardly from said body, the lower end of the leg terminating in a foot forming an abutment against which pressing means may be applied for turning the tool about a fulcrum formed by said thumb.

LOWELL W. SIMONS.